(12) United States Patent
Schubert (10) Patent No.: US 9,279,368 B2
(45) Date of Patent: Mar. 8, 2016

(54) APPARATUS AND METHODS FOR ELIMINATING CRACKING IN A TURBINE EXHAUST SHIELD

(75) Inventor: Paul C. Schubert, Olive Springs, TN (US)

(73) Assignee: EagleBurgmann KE, Inc., Hebron, KY (US)

(*) Notice: Subject to any disclaimer, the term of this patent is extended or adjusted under 35 U.S.C. 154(b) by 862 days.

(21) Appl. No.: 13/370,581

(22) Filed: Feb. 10, 2012

(65) Prior Publication Data

US 2012/0204569 A1  Aug. 16, 2012

Related U.S. Application Data

(60) Provisional application No. 61/441,876, filed on Feb. 11, 2011.

(51) Int. Cl.
*F02C 7/20* (2006.01)
*F01D 25/30* (2006.01)

(52) U.S. Cl.
CPC .. *F02C 7/20* (2013.01); *F01D 25/30* (2013.01)

(58) Field of Classification Search
CPC .............. F23R 3/60; B64D 27/26; F02C 7/20
USPC ................... 60/796–798, 772, 779
See application file for complete search history.

(56) References Cited

U.S. PATENT DOCUMENTS 5,076,049 A * 12/1991 Von Benken et al. ........... 60/797

* cited by examiner

*Primary Examiner* — Craig Kim
(74) *Attorney, Agent, or Firm* — Wood, Herron & Evans, LLP (57) ABSTRACT

Undue flexing and cracking of an internal exhaust shield of a turbine is eliminated by isolating thermally-induced movement in the shield from that of strut apparatus passing therethrough to a surrounding outer exhaust casing. Methods and apparatus are disclosed.

3 Claims, 9 Drawing Sheets

APPARATUS AND METHODS FOR ELIMINATING CRACKING IN A TURBINE EXHAUST SHIELD

PRIORITY CLAIM

Applicant claims the benefit of the filing date of Feb. 11, 2011 of U.S. provisional patent application Ser. No. 61/448,876, the disclosure of which is hereby incorporated herein by reference in its entirety.

FIELD OF THE INVENTION

This invention relates to jet turbines, more particularly to land-based turbines used, for example in Combined Cycle Power Generation facilities and even more particularly to the exhaust structures of such turbines and the inherent problems therein of cracking due to differentials in thermal generated expansion and contraction of the respective exhaust components.

BACKGROUND OF THE INVENTION

Typically, such turbines include an exhaust structure which comprises an outer exhaust casing in the form of an annulus, and an inner exhaust tunnel defined by an annular exhaust cylinder or shield with an annular dead air space defined between the outer casing and the inner shield. Simply stated, an outer casing or cylinder surrounds an inner shield or cylinder in the exhaust area of a turbine.

The turbine typically includes a cylindrical bearing housing disposed around a central axis of a turbine and located and centered there, preferably by two sets or arrays of radially-extending struts. The respective struts in each array, at about 120 degrees apart, are encased in strut housings, extending radially inwardly to the bearing housing from the outer exhaust casing and through the inner shield to the bearing housing. The strut housings are welded to the inner shield, where they pass outwardly therethrough to the outer casing and inwardly therethrough to the bearing housing. Typically the struts, strut housings and inner shield are made from high heat-resistant materials or alloys, including, for example, an alloy known in the industry as "hastalloy".

It is in the area of the welded joinery between the strut housings and the inner shield which suffer the principal consequences of differential thermal-caused material expansion and contraction.

As the turbine is operated, it can produce exhaust gases of high temperatures such as 1000 to 1300 degrees Fahrenheit or more. This heat, applied to the strut housing and to the inner shield causes them to expand or move in respective directions in response to this heating. Thus, the strut housing may expand longitudinally (in a radial direction from the bearing housing) while the inner shield moves or expands in other directions, or at least at different rates, all in response to the exhaust heat. Thus, there is a differential of material movement and destructive force at the welded joint between the strut housing and the inner shield. This differential causes the inner shield to flex, then crack or break apart at the intersection area at and around the welded joint to the strut housing. The dead air space between the inner shield and outer casing is thus opened to direct exhaust gas.

In the past, this material failure is cured only by shutting down the turbine, accessing the cracked area, removing the affected parts of the inner shield and welding replacement and reinforcing plates in the shield and to the strut housing. This work is expensive, requires periods of turbine shutdown, is difficult to access, is subject eventually to repeat of the continuing problem and is, for these and other reasons, very problematical.

Such turbines generally experience these adverse thermally-caused movement and force differentials on startup from inoperative conditions. Those cycles occur periodically on even a daily basis or multiple times per day. Thus, every time the turbine is started, the thermal expansion produces the described stress and flexes the inner shield eventually to failure.

Accordingly, it has been one objective of this invention to provide an improved exhaust structure for turbines which is not subject to the failure of materials due to differential thermal expansion and/or contraction.

A further objective of the invention has been to provide an improved exhaust structure for a turbine extending the life and maintenance requirements of such turbines in the exhaust components.

A further objective of the invention has been to provide an improved method for handling turbine exhaust.

SUMMARY OF THE INVENTION

In summary, a preferred embodiment of the invention contemplates the isolation of thermally-caused expansion in the strut apparatus from thermally caused expansion in the shield. By isolating these respective forces, one from the other, undesirable flexing and cracking of the shield caused by these prior interfering differential forces is eliminated.

This method and result is obtained by passing the strut apparatus through the shield such that both these components are slidable or moveable with respect to each other so that the relative movement of one does not stress or adversely affect the other. A combination of mounting plates, on the shield and stops of the strut apparatus are useful in attaining these results.

These and other objectives will be readily apparent from the following written description and from the drawings in which:

BRIEF DESCRIPTION OF THE DRAWINGS

FIGS. 2A-2E are diagrammatic sketches of the invention of FIG. 1, shown in exploded view illustrating the progressive construction of the invention components for clarity with various components in the FIGS. not shown for clarity and with some components or portions shown in phantom for clarity;

DETAILED DESCRIPTION OF THE INVENTION

Figures 1, 1A:
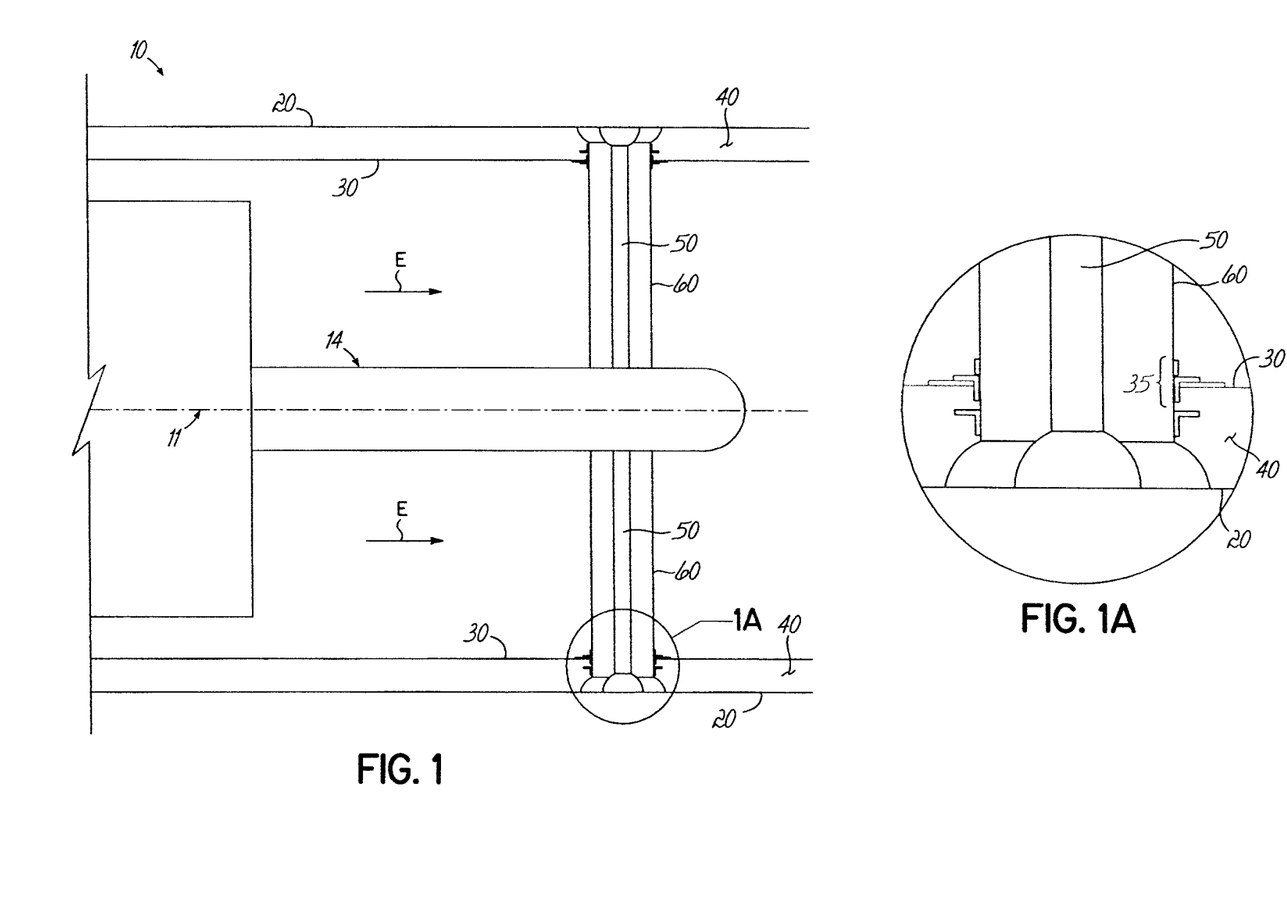
FIG. 1 is a diagrammatic illustration of the invention and turbine environment in which it is used.
FIG. 1A is an enlarged diagrammatic detail of the encircled area 1A of FIG. 1.
Figure 2A:
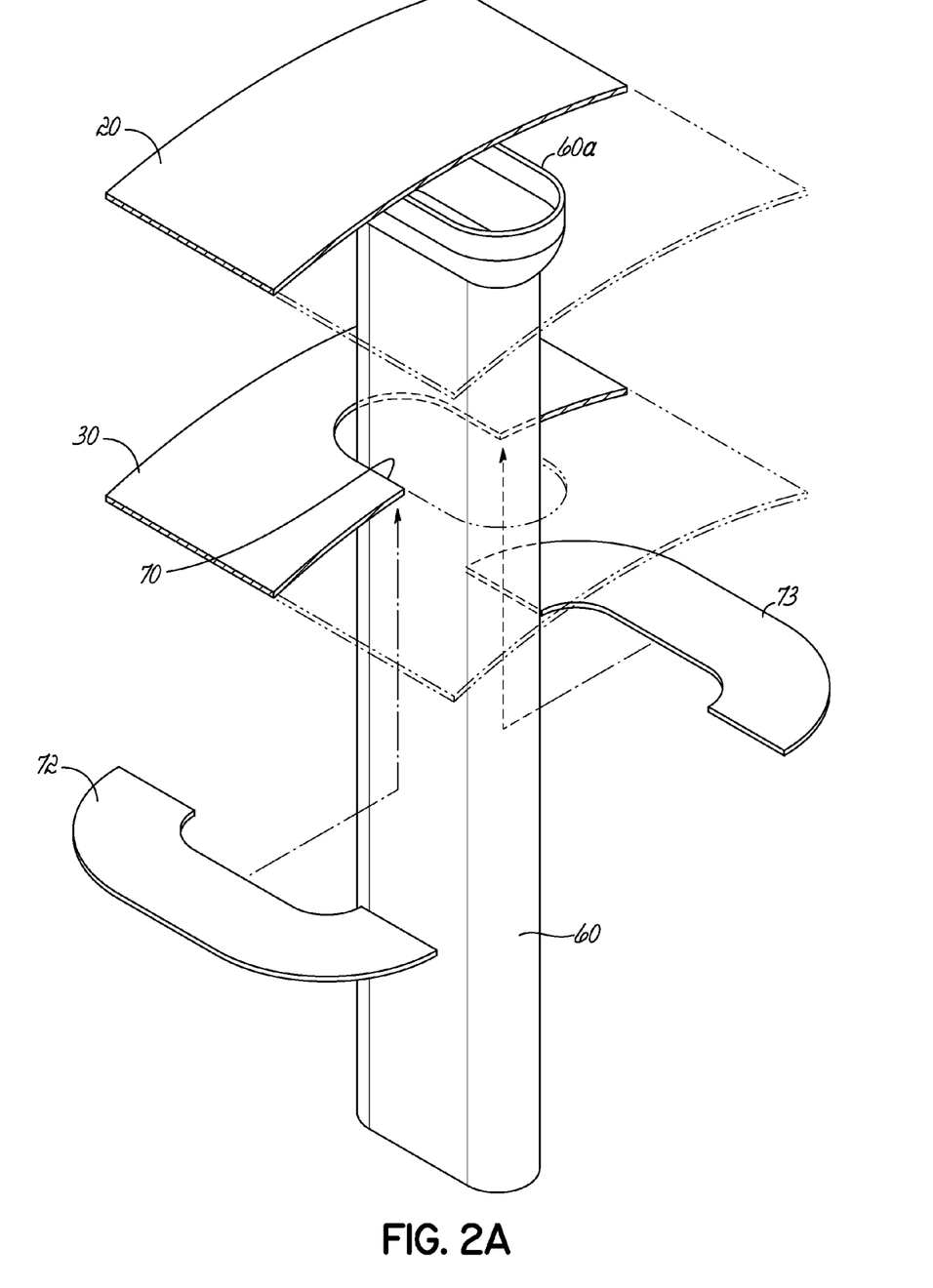
FIG. 2A is an exploded view showing the strut housing inner shield and outer exhaust casing and illustrating positioning of a first pair of complementary mounting plates interiorly of the shield.
Figure 2B:
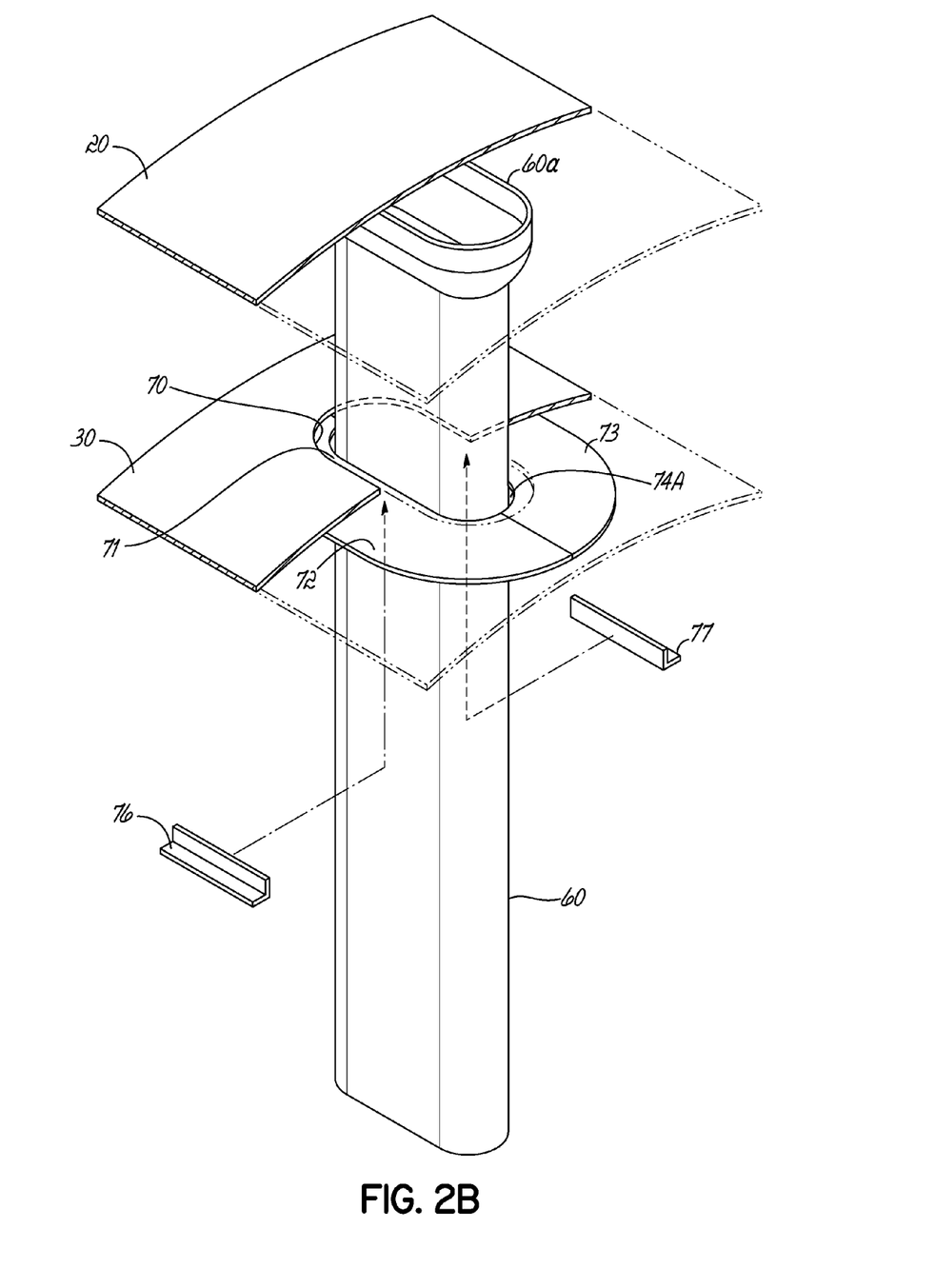
FIG. 2B is an exploded view showing the first pair of mounting plates in position and illustrating insertion of a pair of elongated angle plates.
Figure 2C:
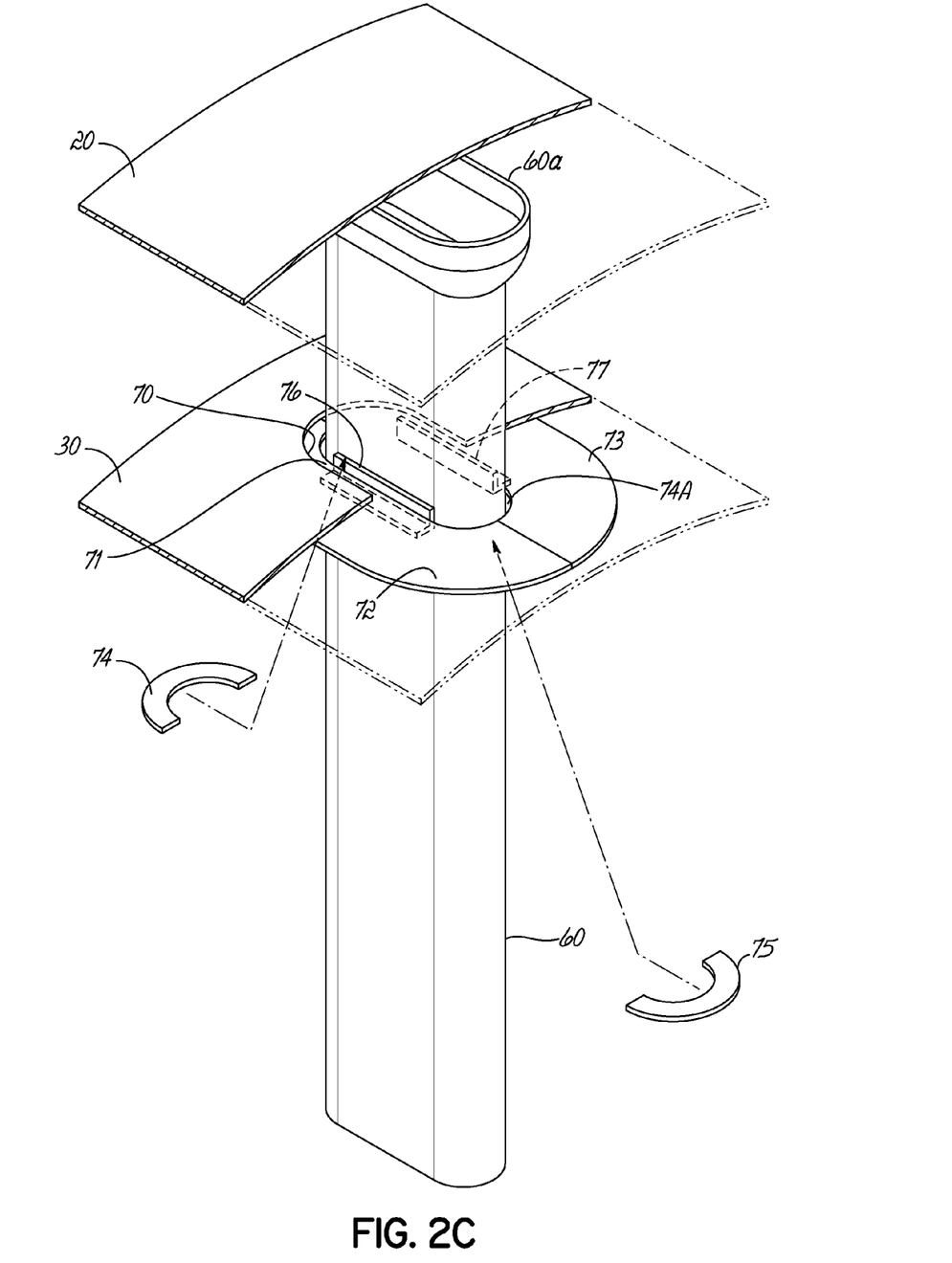
FIG. 2C is an exploded view showing the first pair of mounting plates and the angled filler plates in position and a second pair of complementary mounting plates for mounting interiorly of the first pair of mounting plates and thereon.
Figure 2D:
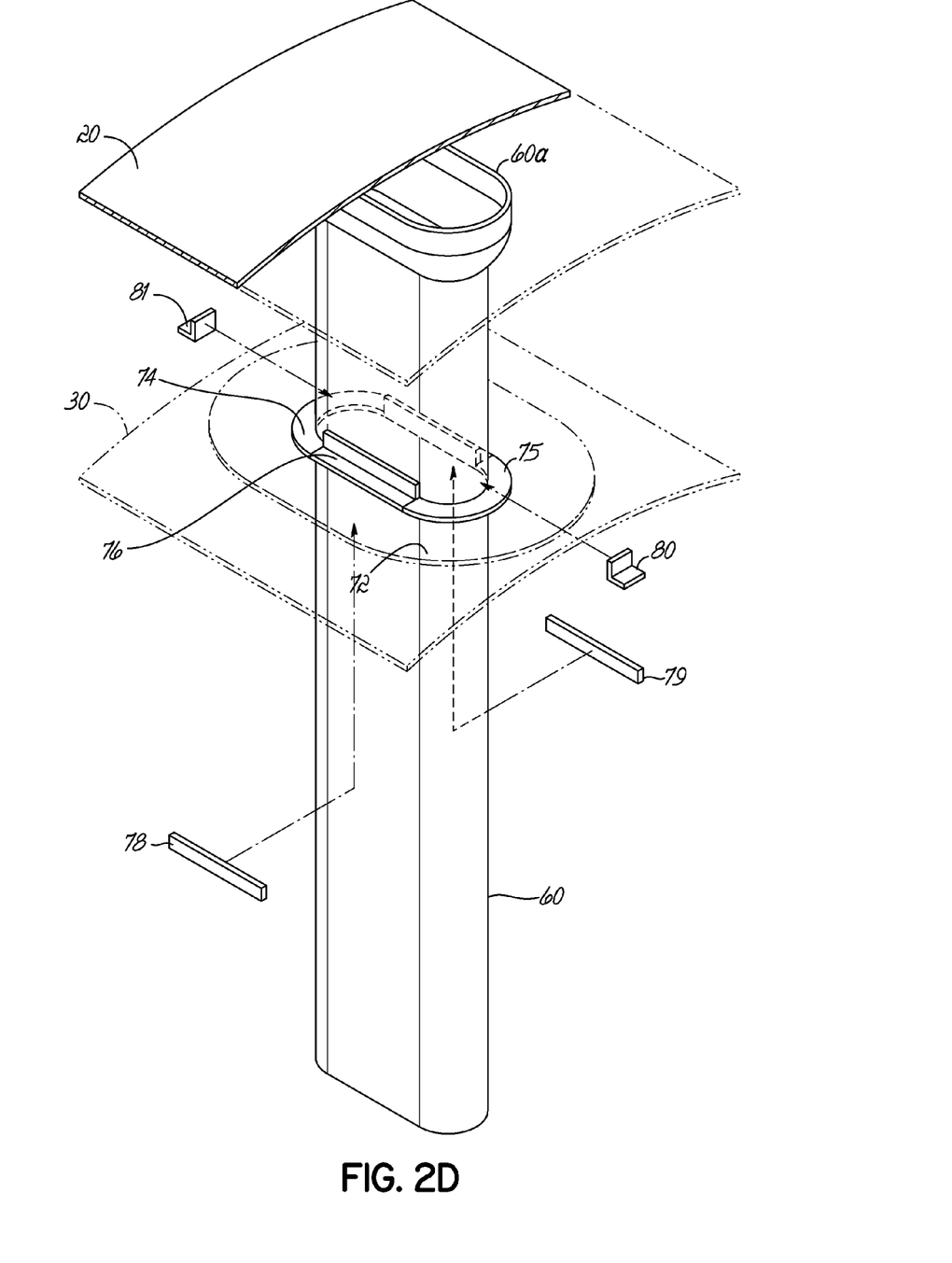
FIG. 2D is an exploded view showing the mounting plate pairs and angled filler plates in position and the respective stop pairs for mounting on the strut housing.
Figure 2E:
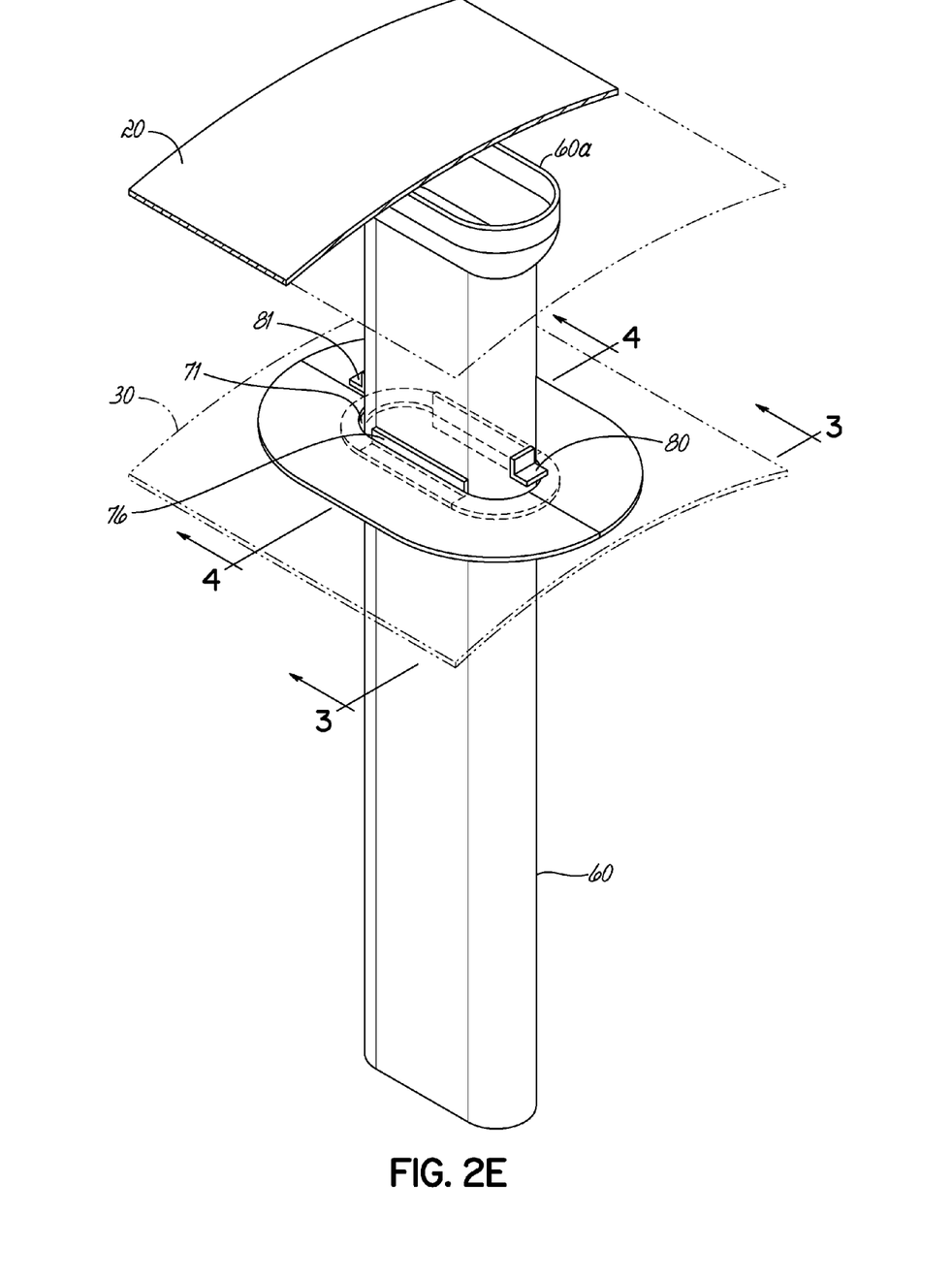
FIG. 2E is an exploded view illustrating the mounting plates and angle fillers and the top members, all in position in the finished construction.
Figure 3:
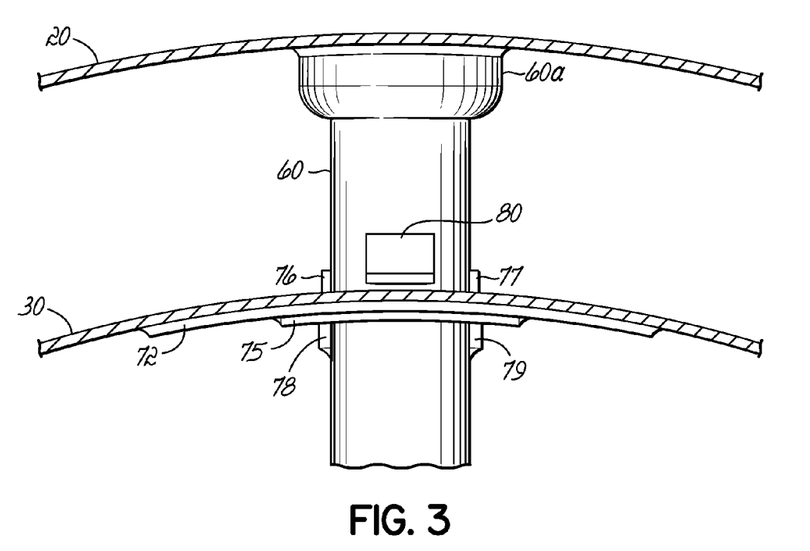
FIG. 3 is a cross-sectional view taken along lines 3-3 of FIG. 2E.
Figure 4:
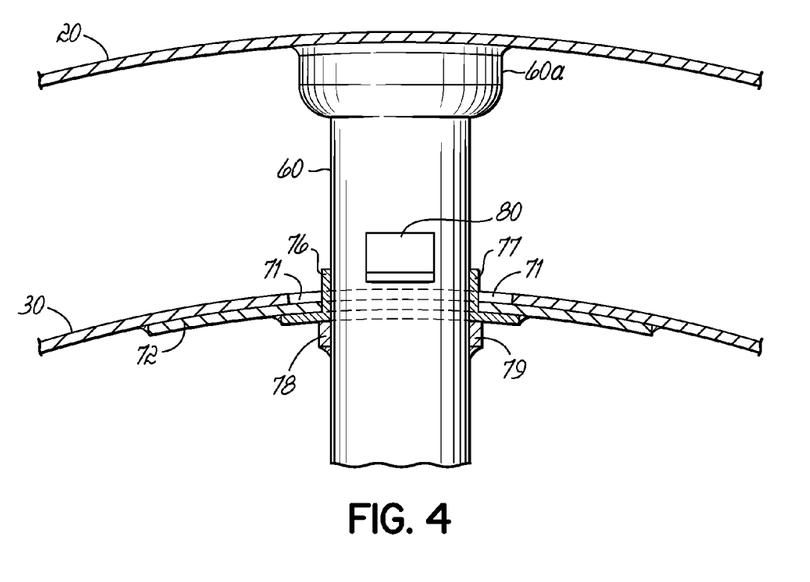
FIG. 4 is a cross-sectional view taken along lines 4-4 of FIG. 2E, with the inner shield positioned with respect to the radially inward elongated stops on the strut housing; and spaced from the radially outward stops.
Figure 5:
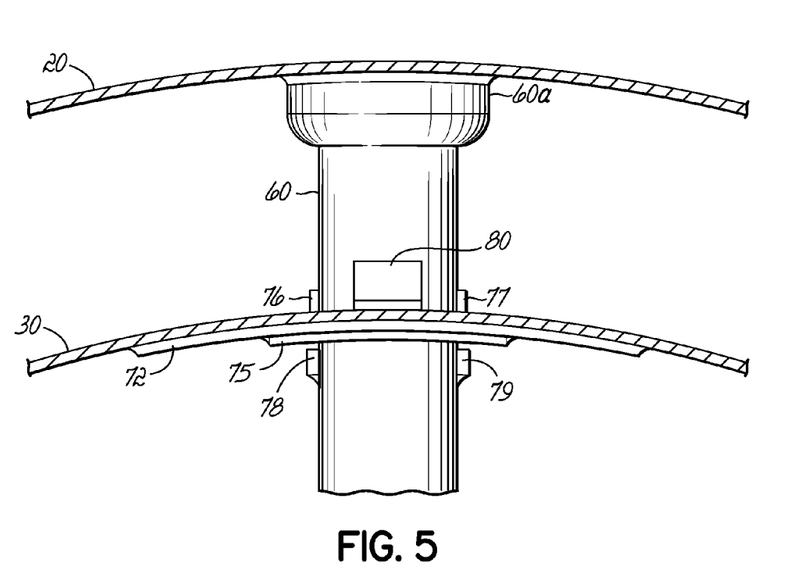
FIG. 5 is a cross-sectional view taken from the same perspective of FIG. 3, but showing the inner shield positioned on the radially outer angle stops on the strut housing spaced from the interior stops.
Figure 6:
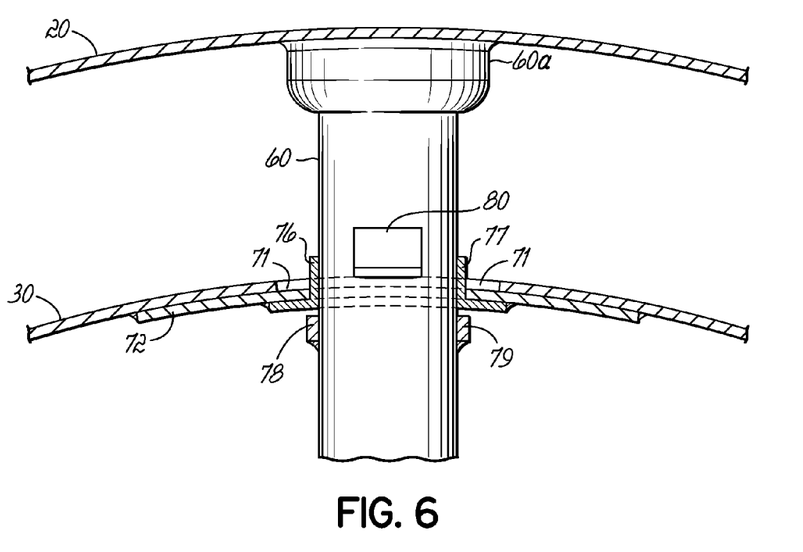
FIG. 6 is a cross-sectional view from the same perspective as FIG. 4 but further showing the position of the inner shield position on the outer angle stops, spaced from the radially inward stops.

Turning now to the drawings, FIG. 1 diagrammatically illustrates the invention and its use. A turbine 10 is oriented about a major axis 11. A bearing housing 14 extends rearwardly from the turbine about axis 11 and provides support for a rotary turbine shaft (not shown). An outer exhaust casing 20 in the form of an annulus or cylinder and defining an outer exhaust cylinder extends rearwardly from turbine 10. An inner shield 30 in the form of an annulus or a cylinder and defining an exhaust tunnel also extends rearwardly from turbine 10, radially inward from outer casing 20. The outer casing 20 outwardly surrounds inner shield 30 such that there is an annular dead space 40 between casing 20 and shield 30. Exhaust from turbine T flows in the direction of arrows E.

A series of radially-extending struts 50 extends from outer casing 20 to bearing housing 14, through shield 30 at intersection 35. Struts 50 are encased in strut housing 60 as shown. Struts 50 and housings 60 are attached, as by welding, to the bearing housing 14 and to outer casing 20 where strut housing end 60a is attached as by welding to casing 20. However, according to the invention and advantageously, neither the housings 60 or the struts 50 are welded to inner shield 30. The intersection 35 or joint area between strut housing 60 and inner shield 30 are shown in more detail in Detail A of FIG. 1 and in the other Figures.

More specifically, and according to the invention, the intersection of strut housing 60 to inner shield 30 is defined as a sliding, relatively moveable or extensible intersection 35 which alleviates any undesirable interconnection between these components. In other words, and in accordance with the invention, any thermal differential expansion, between inner shield 30 on one hand and the housing 60 and struts 50, are accommodated by the relative movement between and at the intersection of the shield 30 and housing 60. These parts are thus free to move responsive to thermal variations without exerting structural impact or force on the other component. As a result, thermal expansions of these components are accommodated without creation of stress on the other component. Cracking due to the differentiation of respective thermal expansion/contraction is thus eliminated, significantly reducing structural failure, maintenance schedules, downtime and expense previously associated with the exhaust structures of turbines.

More particularly, the FIGS. 1A and 2A-6 illustrate the construction steps and final configuration of the interface components of the moving intersection between each strut 50, 60 and the inner shield 30.

Preferably, the shield 30 is provided with an opening 70, larger than but preferably complementary to the elongated, oval-like cross-sectional shape of the strut housing 60. Accordingly, there is a clearance (at 71) between the strut housing 60 and the shield 30. Two pairs of complementary mounting plates 72, 73 and 74, 75 are arranged about the housing 60 and welded to the shield 30 with a small clearance 74A between the formed apertures in plates 72, 73 and the opposed faces of plates 74, 75 with housing 60. Plates 74, 75 are welded along the plates 72, 73. Two elongated angle filler plates 76, 77 are inserted between plates 72, 73 and housing 60 and are welded to plates 72, 73 but not to housing 60. These elongated filler plates 76, 77 extend between ends of plates 74, 75. Accordingly, the housing 60 is not attached to, but extends slidably through shield 30 at intersection 35 so the housing 60 can elongate in thermal response to exhaust heat, but without transferring any of that elongation force to shield 30. Likewise, shield 30 can move in response to thermal stimulus without resulting in undue stress from attachment to the strut apparatus. Housing 60 is thus slidable with respect to filler plates 76, 77.

A pair of stops 78, 79 in the form of elongated bars are welded to housing 60 as shown radially inwardly with respect to shield 30 and angle plates 76, 77.

Likewise, a pair of two, relatively shorter angle-shaped stops 80, 81 are welded to strut housing 60 radially outwardly with respect to shield 30 for non-attached engagement with outer surfaces of shield 30. The distance between the relative shield-facing stop surfaces of stops 78, 79 and 80, 81, respectively are at least slightly greater than the combined thicknesses of shield 30 and the respective plates 72-75, such that there can be relative motion between strut housing 60 and shield 30 in at least a radial direction along strut 60 (and preferably some at least slight motion normal to the radial extension of strut housing 60).

Thus, it will be appreciated that the relative radial position of shield 30 on strut housing 60 is variable between interior stops 78, 79 and outer stops 80, 81.

Figure 7:
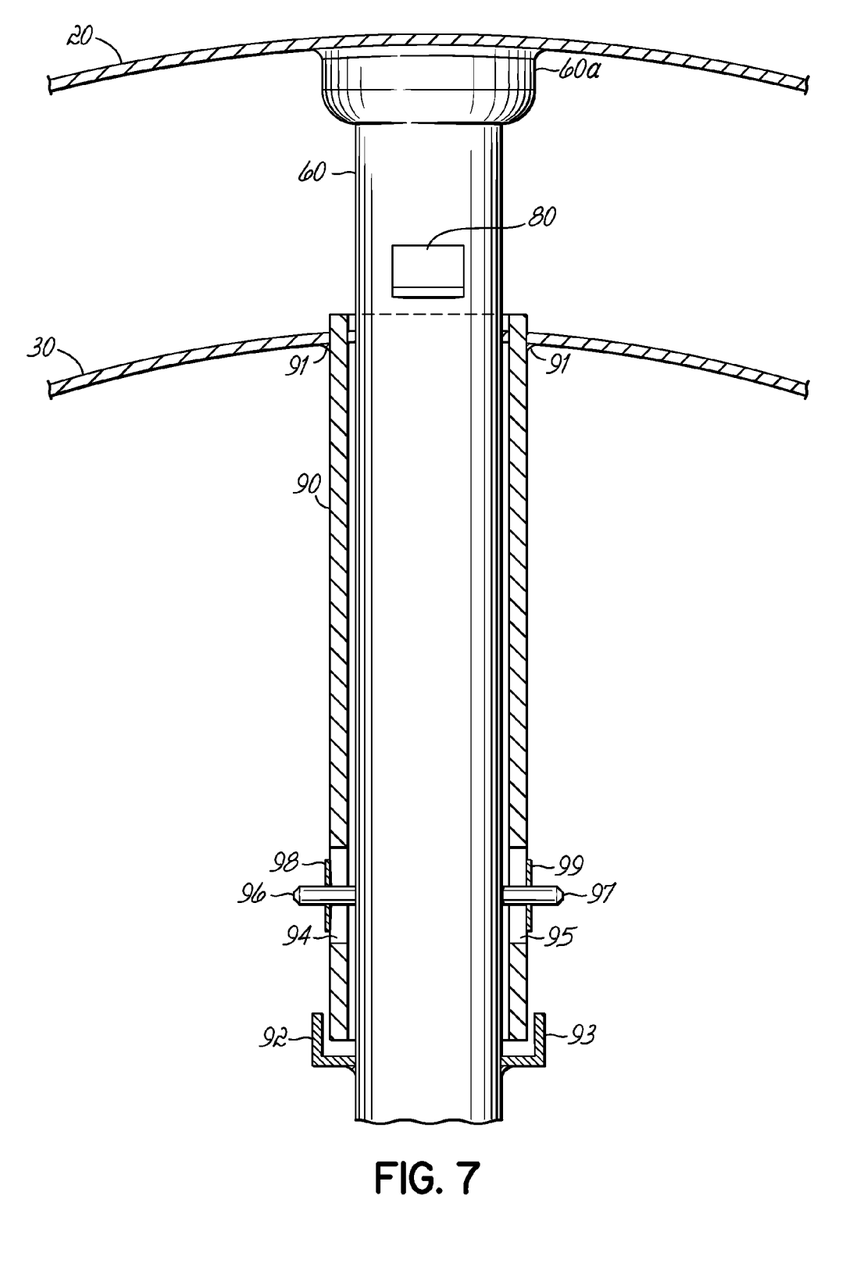
FIG. 7 is an elevational view in partial cross-section similar to FIGS. 3 and 4 but shows an alternate embodiment of the invention showing the inner shield in an intermediate position.

In another aspect of the invention, an alternative embodiment of the invention is illustrated in FIG. 7. This embodiment provides similar function of the preceding embodiment but with a modified structure.

Referring to FIG. 7, it should be noted that stops 78, 79 of FIGS. 1-6 have been omitted. Also, the angled filler plates 76, 77 are omitted. Components of FIG. 7 which are like those in FIGS. 1-6 bear the same numbers. New components with specific new numbers are described below.

In the embodiment of FIG. 7, a collar 90 is provided about the strut housing 60, and is slidable thereon. Collar 90 is welded to shield 30 at an end 91 of collar 90 (or to mounting plates such as plates 72-75, if used in this embodiment).

In place of stops 78, 79 of FIGS. 1-6, there are welded angle stops 92, 93 along the sides of strut housing 60.

Collar 90 is provided with two opposed slots 94, 95 on opposite sides of the collar 90.

Pins 96, 97 are attached to strut housing 60 by welding or any suitable expedient, on opposite sides thereof in a position such that each extends through a respective slot 94, 95, respectively.

Washers 98, 99 of larger extend than slots 94, 95 are secured to pints 96, 97 respectively, so collar 90 is captured thereby on housing 60.

The length of slots 94, 95 is long enough to accommodate translation or movement of collar 90 along strut housing 60 between stops 92, 93 radially inward of shield 30, and stops 80 on housing 60, radially outward of shield 30.

It will be appreciated that collar 90 extends much further along strut housing 60 than did filler plates 76, 77, thereby providing a more efficient sliding contact between the collar 90 and housing 60 than did filler plates 76, 77.

Also, the interaction of pins 96, 97 and slots 94, 95 can define relative parameters of motion of collar 90 on strut 60 as desired.

Accordingly, the actual thermal responsive movement of shield 30 and strut housing 60 in both embodiments do not adversely transfer between these components. Material flex and failure due to thermal expansion or contraction is eliminated, and the exhaust structure for turbine 10 is vastly improved.

Other structures may be used to produce the same or similar isolation of thermal caused movement, reducing and eliminating cracking or damage.

These and other modifications and advantages will become readily apparent to those of ordinary skill in the art to which this invention pertains, without departing from the scope of the invention, and applicant intends to be bound only by the claims appended hereto.

What is claimed is:

1. An exhaust apparatus for turbines which generate hot exhaust gases, said apparatus comprising:
    an exhaust outer casing;
    an exhaust shield disposed inwardly of said exhaust outer casing;
    at least one strut apparatus extending through said exhaust shield to said exhaust outer casing;
    said strut housing comprising an elongated radially extending strut disposed within a strut housing;
    said strut housing attached to said exhaust outer casing and passing through said exhaust shield at an intersection therewith, said exhaust shield and strut housing in relative sliding relationship with respect to each other; and
    further including a slidable collar on said strut housing, said slidable collar attached to said exhaust shield.

2. An exhaust apparatus as in claim 1 further including spaced stops on said strut housing, said collar moveable along said strut housing between said stops.

3. An exhaust apparatus for turbines which generate hot exhaust gases, said exhaust apparatus comprising:
    an exhaust outer casing;
    an exhaust shield disposed inwardly of said exhaust outer casing;
    at least one strut apparatus extending through said exhaust shield to said exhaust outer casing;
    said at least one strut apparatus comprising an elongated radially extending strut disposed within a strut housing;
    said strut housing attached to said exhaust outer casing and passing through said exhaust shield at an intersection therewith, said exhaust shield and strut housing in relative sliding relationship with respect to each other;
    a slidable collar on said strut housing, said slidable collar attached to said exhaust shield;
    said exhaust shield being relatively slidable with respect to said at least one strut;
    wherein elongation of said strut housing and movement of said exhaust shield in response to thermal change are isolated from each other.

* * * * *